United States Patent [19]

Reece et al.

[11] Patent Number: 4,468,528

[45] Date of Patent: Aug. 28, 1984

[54] METHODS AND APPARATUS FOR PROVIDING ENHANCED ANNOUNCEMENTS IN A TELEPHONE SYSTEM

[75] Inventors: Carla F. Reece, Lafayette Township, Boulder County; Vincent D. Vanacore, Boulder, both of Colo.

[73] Assignee: AT&T Technologies, Inc., New York, N.Y.

[21] Appl. No.: 361,312

[22] Filed: Mar. 24, 1982

[51] Int. Cl.³ .................. G11B 31/00; H04M 3/50; H04Q 3/66

[52] U.S. Cl. .................. 179/18 B; 179/6.05; 179/27 D

[58] Field of Search .......... 179/27 D, 27 FG, 27 FH, 179/27 FB, 18 B, 6.05, 6.17, 6.03

[56] References Cited

U.S. PATENT DOCUMENTS

| | | | |
|---|---|---|---|
| 3,889,291 | 6/1975 | Walker | 360/12 |
| 3,943,290 | 3/1976 | Golden | 179/6.05 |
| 3,974,338 | 8/1976 | Luzier et al. | 179/6.05 |
| 4,066,847 | 1/1978 | Giordano | 179/27 D X |
| 4,289,934 | 9/1981 | Pitroda et al. | 179/27 D |

FOREIGN PATENT DOCUMENTS 2533700 2/1977 Fed. Rep. of Germany ..... 179/6.17

OTHER PUBLICATIONS

"Meeting Business Needs With The No. 2B ACD", C. E. Morse, *Bell Laboratories Record*, vol. 53, No. 4, (Apr. 1975), pp. 181-188.

"Automatic Call Distribution-ASDP 162", Brown and Clark, *Telecommunication Journal of Australia*, vol. 29, No. 3 (1979), pp. 245-255.

*Primary Examiner*—Thomas W. Brown
*Attorney, Agent, or Firm*—J. J. Jordan; R. F. Kip, Jr.

[57] ABSTRACT

Method and apparatus for providing a timed sequence of different recorded announcements to an incoming caller to hold the caller's attention in a telephone system when no operator is available to answer the incoming call. During intervals in the timed sequence when no announcement is connected to the incoming caller, music is transmitted. When an operator becomes available to answer the call, the incoming caller is disconnected from the recorded announcement or music, whichever is applicable, and connected to the idle operator.

3 Claims, 7 Drawing Figures

METHODS AND APPARATUS FOR PROVIDING ENHANCED ANNOUNCEMENTS IN A TELEPHONE SYSTEM

TECHNICAL FIELD

This invention relates to methods and arrangements for providing recorded announcements on a telephone line and in particular to methods and arrangements for providing a timed sequence of different recorded announcements or enhanced announcements to an incoming caller in order to hold the caller's attention in a telephone system when no operator is available to answer the incoming call.

BACKGROUND OF THE INVENTION

In most Private Branch Exchange (PBX), station group systems, such as a group of operators handling airline reservations, or a group of operators responding to questions concerning Medicare benefits, PBX switching circuitry automatically distributes incoming telephone calls to idle operators as the incoming calls are received. However during busy conditions when the incoming calls are received faster than the operators are able to handle the calls, additional circuitry within the PBX places the calls which cannot be immediately handled by an operator in a sequence, or queue, so that the first call received and put in the queue will be the first call handled when one of the busy operators becomes idle. As each first call in the queue is given over to an idle operator, each succeeding call in the queue is automatically moved up one step in the queue to where eventually each call in the queue is serviced by an operator. Although the calls are moved as expeditiously as possible in the queue, some incoming calls may have to wait for several minutes before reaching an operator, especially during extremely busy periods such as during holidays or certain benefit days in the month.

So that callers who have placed calls to a busy operator group and have been automatically switched to a queue awaiting an idle operator do not become anxious and hang-up, various arrangements have been devised to attempt to maintain the waiting caller's attention. For instance, the waiting caller typically hears a recorded announcement and then silence or a recorded announcement which is repeated at closely timed intervals, or a recorded announcement followed by music until the call is eventually answered by an idle operator. Although the above arrangements do provide some information and solace to callers, the arrangements are limited in the amount of useful information which can be provided to callers and, in some instances, can even add to the anxiety experienced by a waiting caller. For instance, in extremely busy situations, where the queue in which callers are placed is slow-moving or long, a single intital recorded message followed by prolonged music or silence stimulates anxious callers to hang-up and call back immediately, thus placing these callers further back on the queue each time they hang-up and call back. Eventually the caller stops trying to place the call since the answering routine has left the caller frustrated and with an impression of poor service.

There is a need therefore, for an enhanced announcement arrangement which will provide a caller with useful information regarding the handling of the call while also maintaining the caller's attention.

SUMMARY OF THE INVENTION

The above problem is solved by this invention which allows a plurality of different recorded announcements to be transmitted in a timed sequence to each incoming caller while waiting on a queue for an idle operator. Each announcement of the plurality of announcements can be tailored to inform the incoming caller regarding his or her call, and music can be interspersed between announcements.

In a particular embodiment of the present invention, an arrangement having three different recorded announcements is disclosed. Each announcement is followed by music for a duration of between two and thirty seconds, which time interval is alterable at the option of the customer. The announcements can each be a maximum of one minute duration and when the last of the three announcements is made, the caller will hear music or the announcements can be repeated until an operator answers the call.

BRIEF DESCRIPTION OF THE DRAWINGS

Other features and advantages of the invention, its organization, construction and operation will best be understood from the following detailed description of a specific embodiment thereof, taken in conjunction with the accompanying drawings in which.

DETAILED DESCRIPTION

Figure 1:
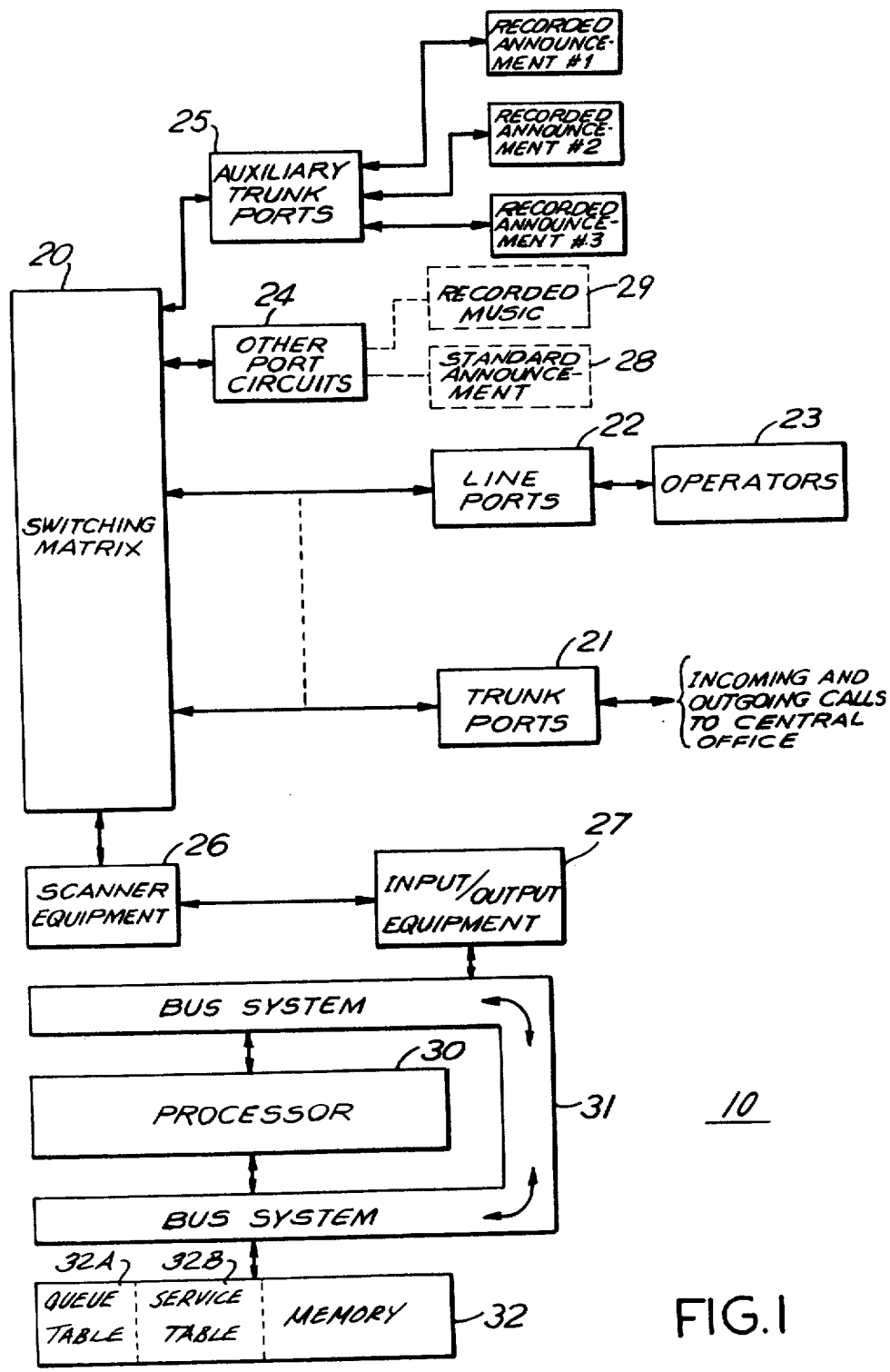
FIG. 1 is a block diagram of a Private Branch Exchange (PBX) in accordance with certain principles of the invention.

Referring now to FIG. 1, there is seen a block schematic diagram of a PBX system 10 comprising a switching matrix 20 for interconnecting a plurality of peripheral units such as port circuits with other equipment in the system and with each other. For instance, matrix 20 interconnects a number of trunk ports 21 through which incoming and outgoing calls are handled between system 10 and a telephone central office; interconnects a number of line ports 22 for connecting a number of operators 23 with matrix 20; and interconnects other miscellaneous ports 24 for providing various tones and signals such as a standard announcement, and music, and other circuit functions. Auxiliary trunk ports 25, which have three recorded announcement machines #1, #2 and #3 connected with them, are also connected to matrix 20. A typical recorded announcement machine which can be used herein is the KS-16765 Recorded Announcement Unit, which can be purchased from the Western Electric Co., Inc. of New York, N.Y. System 10 also includes scanner equipment 26, input/output equipment 27 and a central processor 30.

The functions of the port circuits 21, 22, 24 and 25 are to provide a means to connect circuits to matrix 20 (talking path), to provide on-hook/off-hook status to the scanner 26 and to receive processor commands to have the circuit associated with the port circuit change state (e.g., become idle, busy, etc.)

Scanner equipment 26 has two essential functions. One is to address a specific port circuit as a result of commands received from processor 30 (e.g., connections to matrix 20). The other function is to return scan data to processor 30 via bus system 31 regarding the status of the scanned port circuits.

Input/output equipment 27 facilitates the transmission and reception of data to and from scanner equipment 26.

Central processor 30 controls all the activities in system 10 by executing instructions which are part of a control program stored in memory 32.

Processor 30 executes instructions according to a priority of tasks established by the control program and time is allocated for the performance of tasks in accordance with system 10 activity. The time allocations divide the time between call processing and maintenance routines. The time for lower priority tasks may be allocated to higher priority tasks when certain conditions exist (e.g. during periods of heavy traffic, more time is devoted to scanning functions and less to maintenance programs).

Processor 30 reads a control instruction from memory 32 at a rate of approximately one instruction every 10 to 25 milliseconds, and, in response to the read control instruction executes a series of commands. Processor 30, communicating with system 10 by using bus system 31, can, for example, transmit a series of commands over bus system 31 to scanner equipment 26 to scan for changes in the busy/idle status of the various ports interconnected with matrix 20.

Central processor 30 controls call processing by periodically interrogating the status of various circuits within system 10 such as port circuits 21, 22; matrix 20 and scanner equipment 26 interpreting changes of status in these circuits and issuing commands to particular circuits in accordance with instructions read from memory 32 to advance a call status in a logical manner. Changes in central processor 30 control are also generated by program timers which are interpreted as changes which require advancing the call status. The progress of each call handled by system 10 is recorded in memory 32 in a call progress table and a change of state in any unit involved with the call is detected by scanner equipment 26 and transmitted to processor 30 via bus system 31. Processor 30 next consults the control program stored in memory 32 to determine the next logical step to be undertaken to process the call, and commands are then transmitted by processor 30 to have the necessary tasks accomplished by the required circuits to perform the next step in the call handling program sequence.

Memory 32, which stores the control program, contains memory areas called progress tables for storing data collected by processor 30 regarding the progress of each call being handled by system 10 and contains other memory areas called status tables which show the current status of each piece of equipment in system 10. Additionally, memory 32 has memory locations, called queues, into which processor 30 stores identification information regarding incoming calls awaiting connection to an idle operator 23. Thus not only does processor 30 read instructions from the control program stored in memory 32, processor 30 also writes data into particular locations of memory 32 regarding call handling and the status of equipment within system 10.

Referring to FIGS. 2-5 and 7, the flow diagrams illustrated therein reveal the steps of an enhanced announcement program which enables system 10 to connect a number of different announcements in a timed sequence to an incoming caller to hold the incoming caller's attention until a busy operator becomes idle.

Figure 2:
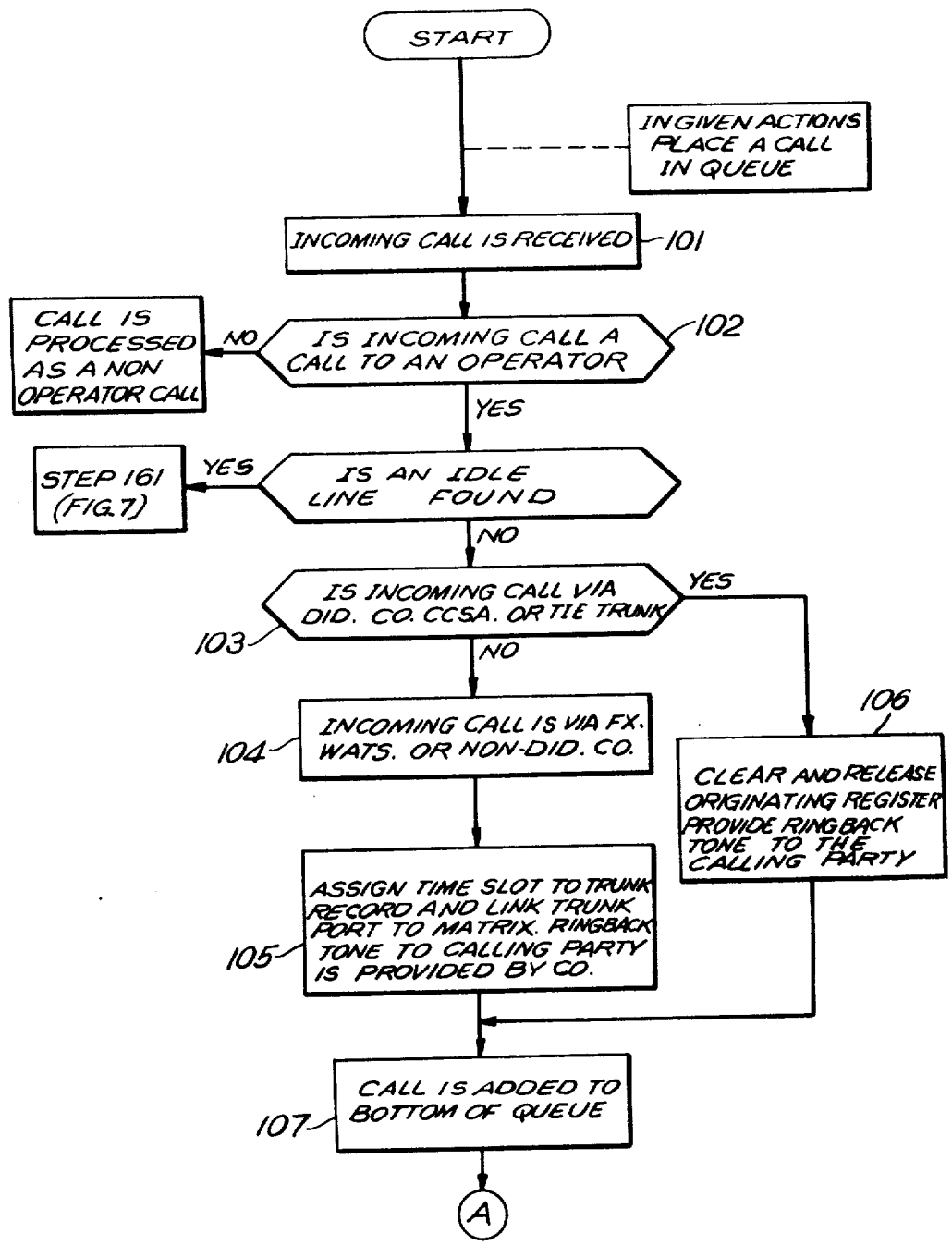
FIGS. 2, 3A, 3B, 4, 5 and 7 show various flow diagrams which illustrate the programmed procedure of control and operation of the system of FIG. 1 in accordance with certain principles of the invention.

Incoming calls dialed into system 10 are received from a central office through one of the plurality of trunk ports 21 in step 101 of FIG. 2. The digits dialed by the calling party are scanned by scanning equipment 26 and transmitted to processor 30 to determine whether or not the call is to be placed with one of the operators 23 in step 102. If the call is an operator call, processor 30 checks the status, stored in memory 32, of each of the line ports 22 to determine whether or not an associated operator 23 is idle. If an operator 23 is idle, processor 30 arranges to interconnect the incoming call on trunk port 21 to the line port 22 associated with the idle operator 23 by closing particular switching points in matrix 20 by transmitting commands via bus system 31 according to the operational program stored in memory 32.

If the status check of the line ports 22 indicates that all operators are busy, processor 30 next determines what type of incoming call is being received in step 103 of FIG. 2. Depending on the type of incoming call, (for example Direct-Inward-Dialing (DID) trunk, or a WATS line) central processor 30 issues instructions in steps 104, 105, 106 to have ringback tone returned to the calling party and assign memory in the progress table, called time slots, to identify the incoming call in memory 32. With no operator 23 idle to handle the incoming call, an identification of the memory call is now added to the bottom of a queue table 32a in memory 32 in step 107, FIG. 2.

Figure 3A:
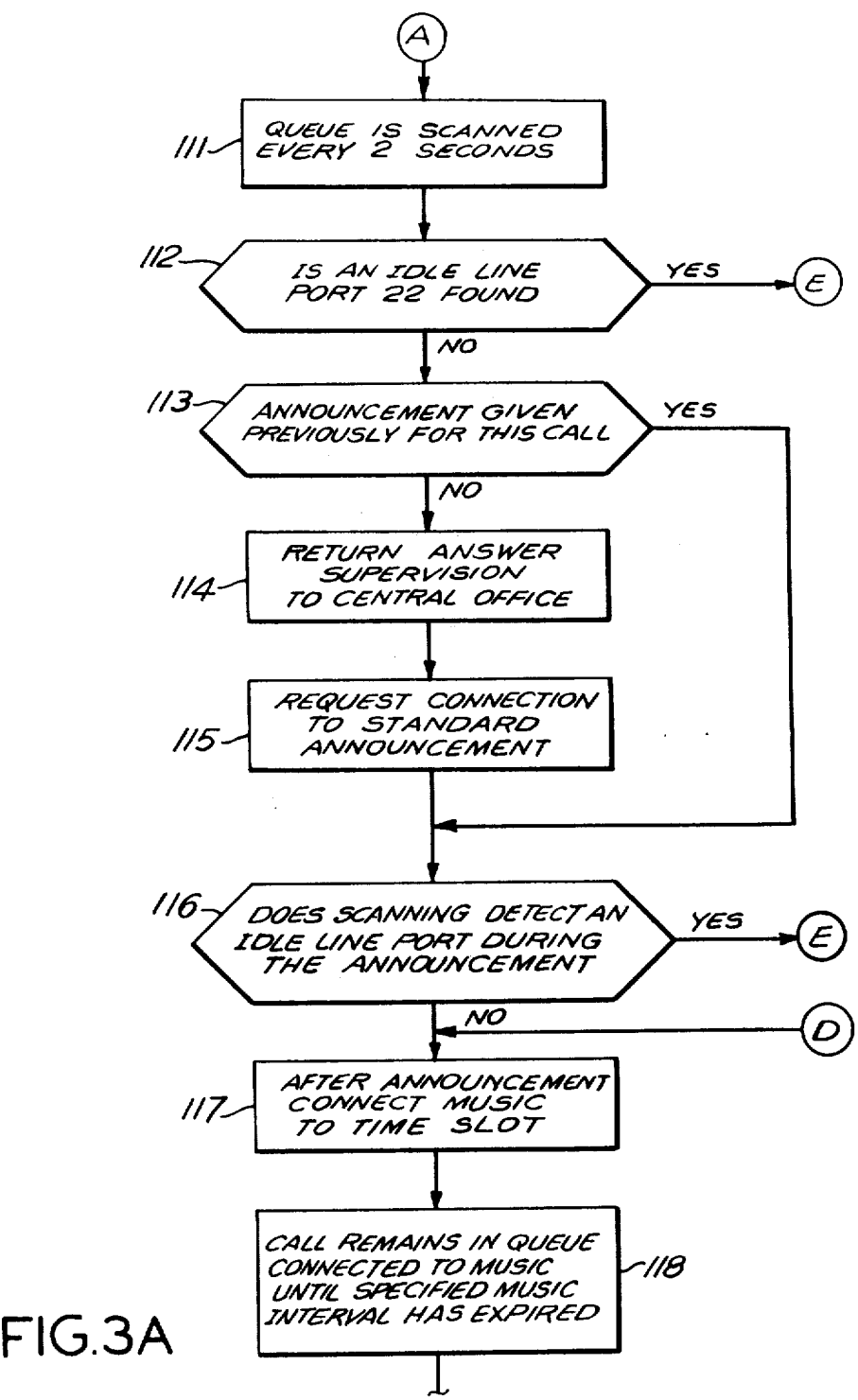

In FIG. 3A, a continuation of the flow chart represented by FIG. 2, at step 111 the queue is scanned every two seconds by processor 30 to determine if any incoming caller has terminated a call or what calls require connection to announcements. Additionally, processor 30 is scanning the status of line ports 22 to connect the call waiting in the top position of the queue with an idle operator 23 when a line port 22 becomes idle at step 112. If the call has been previously connected to the standard announcement provided by announcement machine 28, the call is progressed to step 116; if not, processor 30 arranges to have the call connected to standard announcement machine 28 through a miscellaneous port 24 as seen in steps 113, 114, 115.

After the standard announcement has been returned to the caller, processor 30 arranges to connect music to the caller in step 117. Music is typically provided by a connection to an external music source such as a company which provides background music or by connection to tape recording machine 29 which is accessed through a miscellaneous port 24 as seen in FIG. 1.

Figure 6:
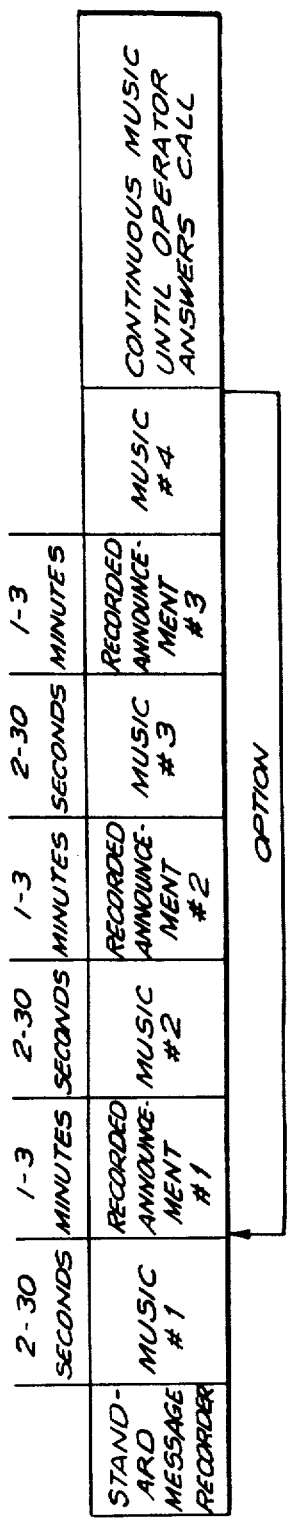
FIG. 6 is a time flow chart showing the time relationship among the various announcements.

FIG. 6, representing a time chart of the progress of the incoming call after connecting to standard message recording 28, shows the call being first connected to music for a time period #1 for between 2 and 30 seconds, which time period is alterable to fit needs of the customer using system 10. For instance, if the customer wishes the incoming caller to be quickly connected to the next announcement, announcement #1, so as to lessen the chance that the caller will hang up during time period music #1, the time period is made 2 seconds. If, on the other hand, the customer wishes to have the recorded announcements spaced during a longer time segment, the music period can be set at 30 seconds, or any two second time increment between 2 and 30 seconds. To set the time of the music period, the operation program stored in memory 32 is set to have processor 30 activate and respond to timing signals to achieve the proper period.

Referring again to FIG. 1, the incoming call appearing at trunk port 21 now has music interconnected with it by means of processor 30 transmitting signals over bus system 31 to switching matrix 20 as seen in step 117 as seen in FIG. 3A. The incoming call identification still remains in the queue in memory 32 since no operator 23 has become idle, but the call is now connected to music until the customer specified music interval (i.e., 10 seconds) has expired.

Figure 3B:
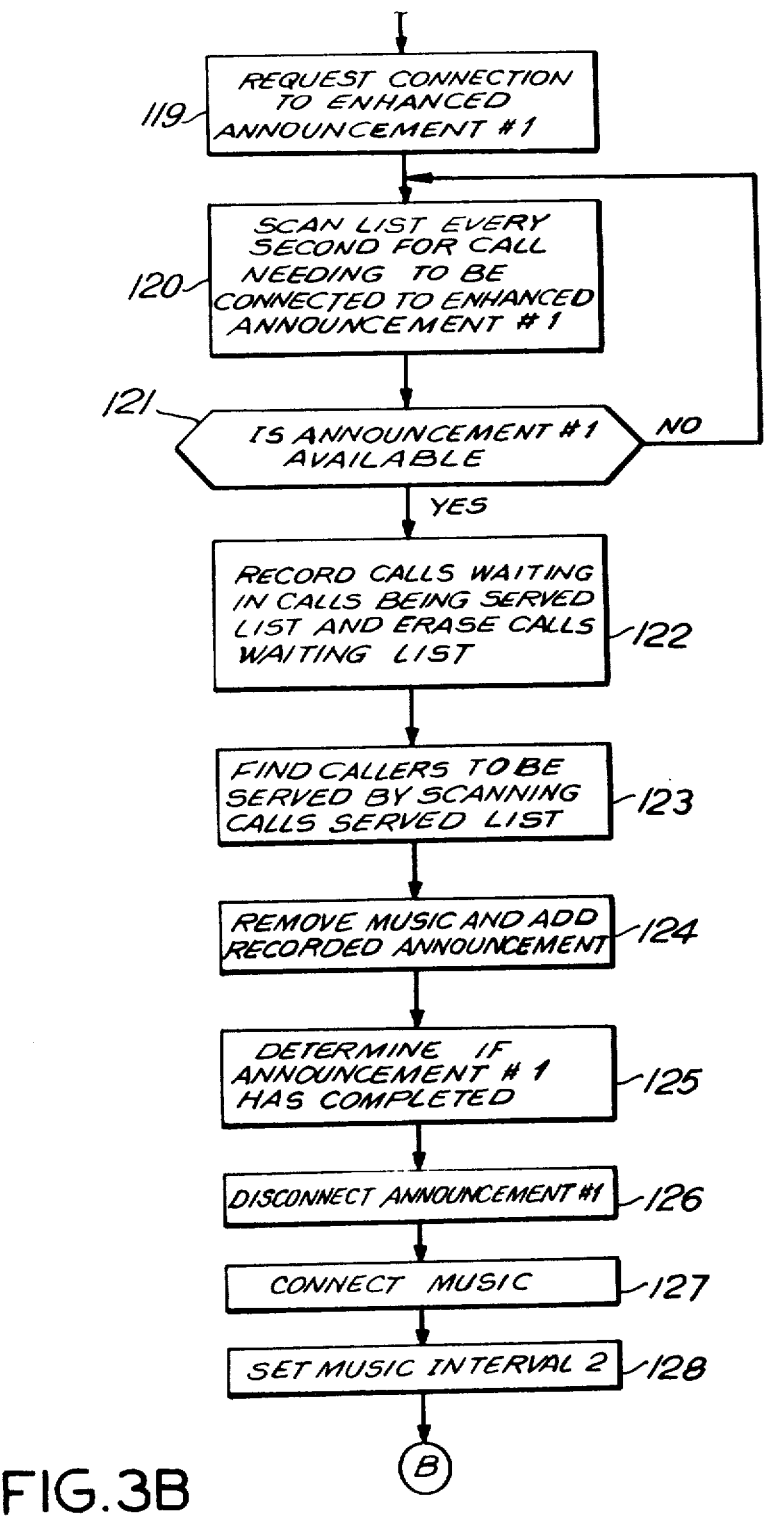

When music interval #1 has expired, processor 30 issues commands for the connection of the incoming call to enhanced announcement machine #1 in step 119, as seen in FIG. 3B. This may or may not be immediately accomplished depending on what portion of the announcement contained in announcement machine #1 is presently being transmitted to other calls. To insure that the connection between incoming call on port 21 and announcement machine #1 is made at the beginning of the announcement, processor 30 enters the incoming call on a list or service table 32b in memory 32, which list records all calls requiring connection to announcement machine #1. The list is scanned every second to determine which calls appear on the list (step 120) and when announcement machine #1 becomes available, that is when announcement machine #1 is about to begin at the start of the announcement, processor 30 issues commands for all incoming calls appearing on the list to be interconnected with recorded announcement machine #1 through switching matrix 20 and an auxiliary trunk port 25. At the same time, processor 30 erases the incoming call from the calls waiting list and enters it on the calls being served by announcement machine #1 list in memory 32 (Step 122). Processor 30, using the information relating to the incoming call contained in the served list, determines which port circuit 21 is associated with the incoming call on the list, removes music from the call, and adds recorded announcement to the call by signaling matrix 20 and scanner equipment 26 via bus system 31 as denoted in steps 123 and 124. After announcement #1 has been completed, announcement #1 is disconnected and music is again connected to the incoming caller as seen in steps 125, 126 and 127. As described above, with music interval #1, music interval #2 is set by the customer for any duration between 2 and 30 seconds and processor 30 arranges for a timer to set the music interval #2 (FIG. 6).

During the time processor 30 was performing steps 117 to 128, processor 30 was also interrogating scanner equipment 26 to determine if any operator 23 has become idle. If an operator does become idle, the incoming call recorded in the first position of the queue is immediately interconnected with the idle operator through matrix 20 and each of the remaining calls in the queue are moved up one position.

Figure 4:
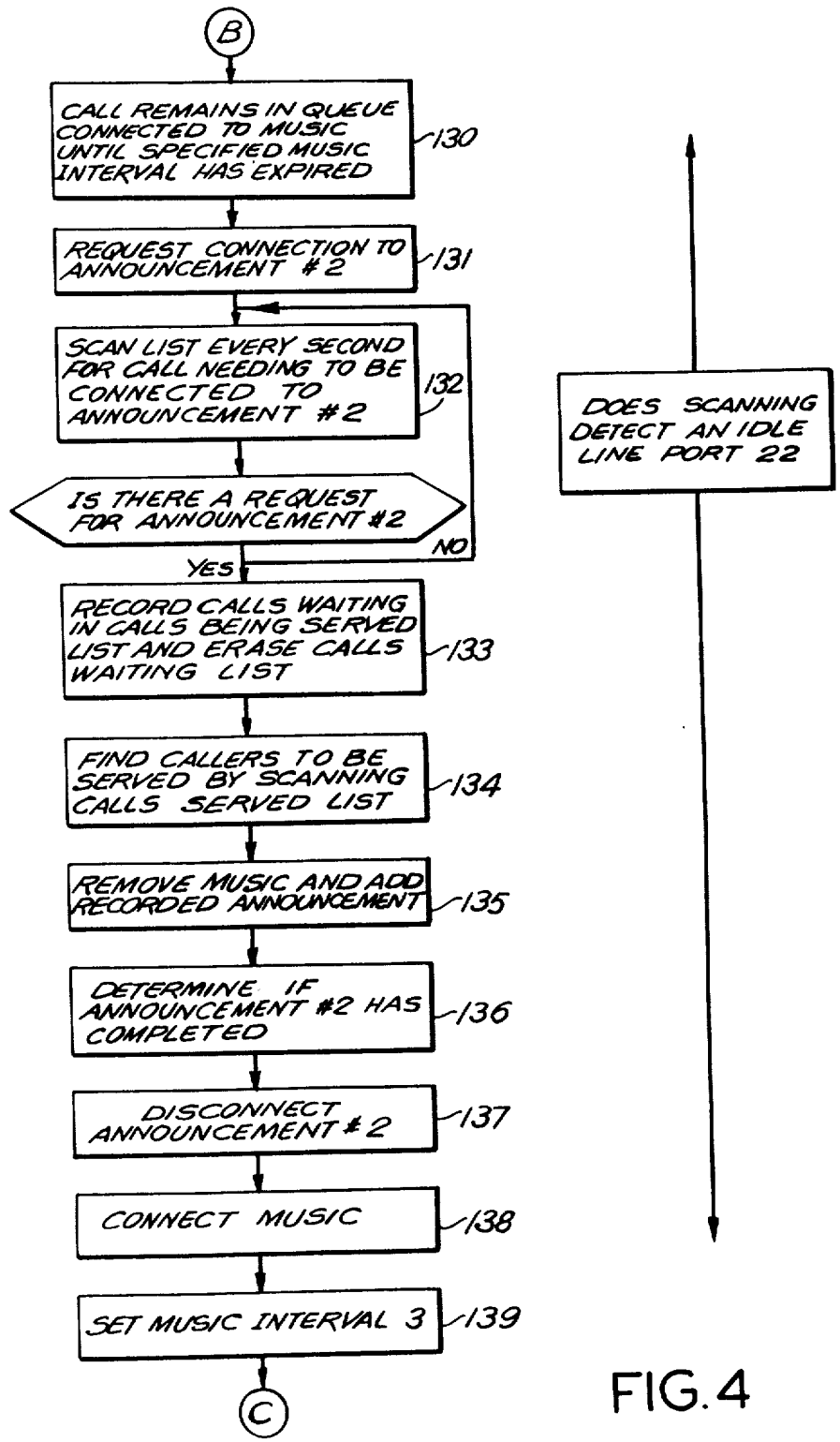

In Steps 130 through 139 of FIG. 4 the incoming caller is connected to recorded announcement machine #2 in the same manner as was explained for connection to recorded announcement machine #1 during steps 118 to 128 of FIG. 3. After completion of recorded announcement #2 the incoming caller is connected to music interval #3 in step 139 and as seen in FIG. 4. Additionally, processor 30 has been interrogating the status of the plurality of operators 23 to determine if an operation is idle during the time steps 130 to 139 have been accomplished.

Figure 5:
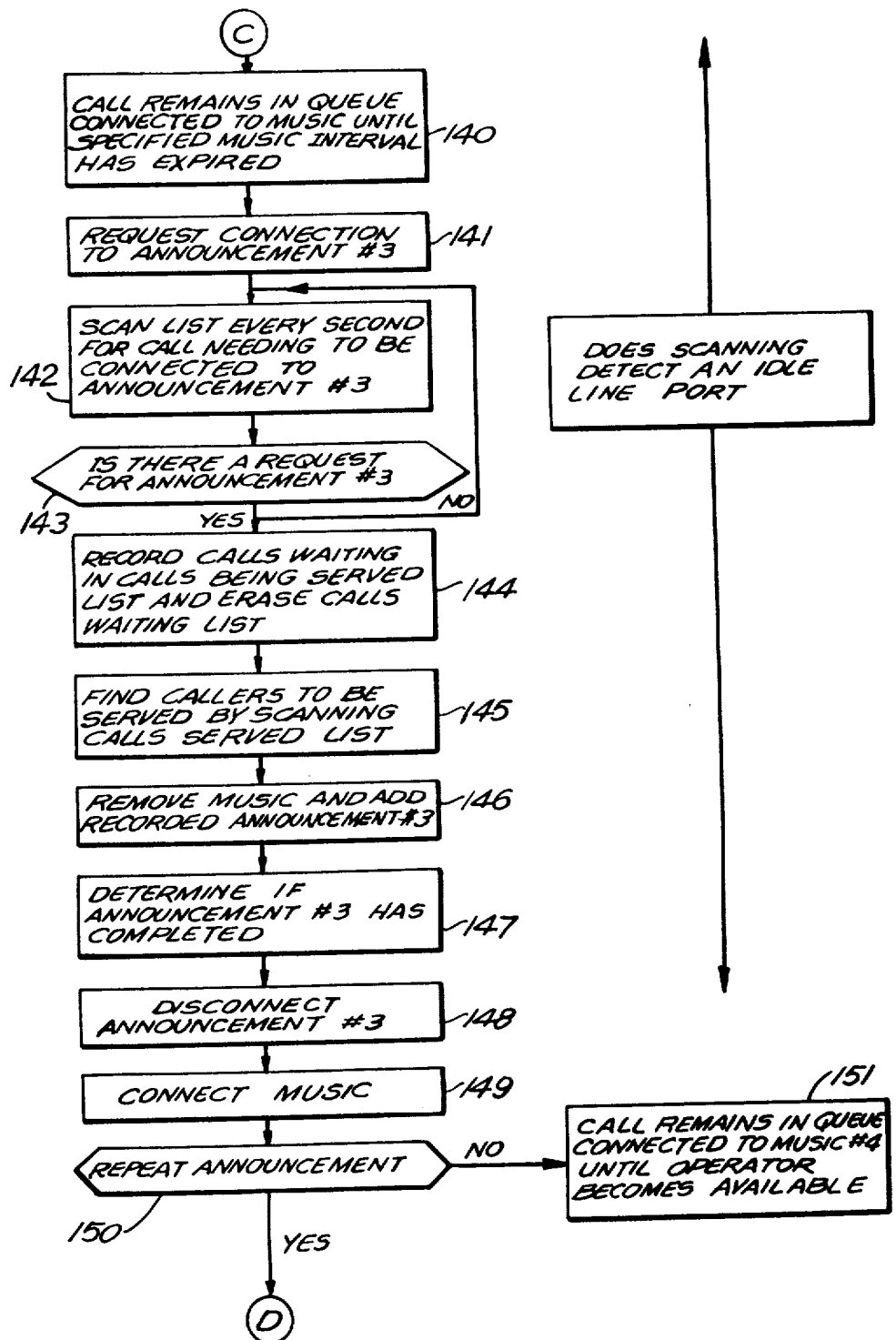

FIG. 5 shows steps 140 through 148 which describe the connection of the incoming caller with recorded announcement #3, which is the same program procedure as described above for announcement #1. At step 148 recorded announcement #3 is disconnected from the incoming caller after completion of the announcement, and in step 149 music is transmitted to the incoming caller.

In Step 150, processor 30 makes a decision as to whether or not the customer has selected an option to have the announcements repeated. If the customer desires to have the announcements repeated, the program stored in memory 32 has been modified to have processor 30 return now to step 119 of FIG. 3, after music interval #4 has expired. If the customer requests that the announcements are not to be repeated, the caller is connected to continuous music until an operator 23 becomes available to handle the call in step 151.

The incoming caller has now been connected to three different enhanced announcements designed to alleviate caller anxiety and to keep the caller from hanging up and placing the call again. For example, if System 10 is a Medicare Office and the operators 23 trained to handle Medicare beneficiary claims, the following three enhanced announcements are used:

MESSAGE #1

"I am sorry but all of our interviewers are busy at this time helping other Medicare beneficiaries. If you are calling about a Medicare settlement, please have a copy of the settlement in front of you in order to give the interviewer the information she will need to help you. Also have your Medicare card available in order to check your Medicare number.

We are unable to check on your claim or give proper answers to your questions unless you give us your correct Medicare number. Please continue to hold until someone can be with you." MUSIC

MESSAGE #2

"Thank you for waiting, we're sorry, but all of our interviewers are still busy. One will be with you shortly. If you have filed a Medicare claim within the last four weeks, we suggest that you please wait another two weeks before making further inquiries. At this time of year, we have a heavy volume of claims. Also on many claims there is a delay because additional information is needed to complete the settlement. Remember, please have your Medicare Card ready to give the interviewer your correct Medicare number when she answers the call." MUSIC

MESSAGE #3

"Thank you for waiting. The interviewers are still busy with other beneficiaries. As soon as an interviewer is available, she will help you. Your call has been placed in order and if you hang up and call back you will lose your turn. This is a recording and the messages will now be repeated, but please help us to help you by knowing that as soon as possible an interviewer will be with you. We want to give each person our fullest attention and it does take time to answer each call." MUSIC Each of the three announcements takes approximately one minute, and relays information to the caller concerning the call while at the same time allaying caller anxiety concerning the systems' ability to handle the call.

Figure 7:
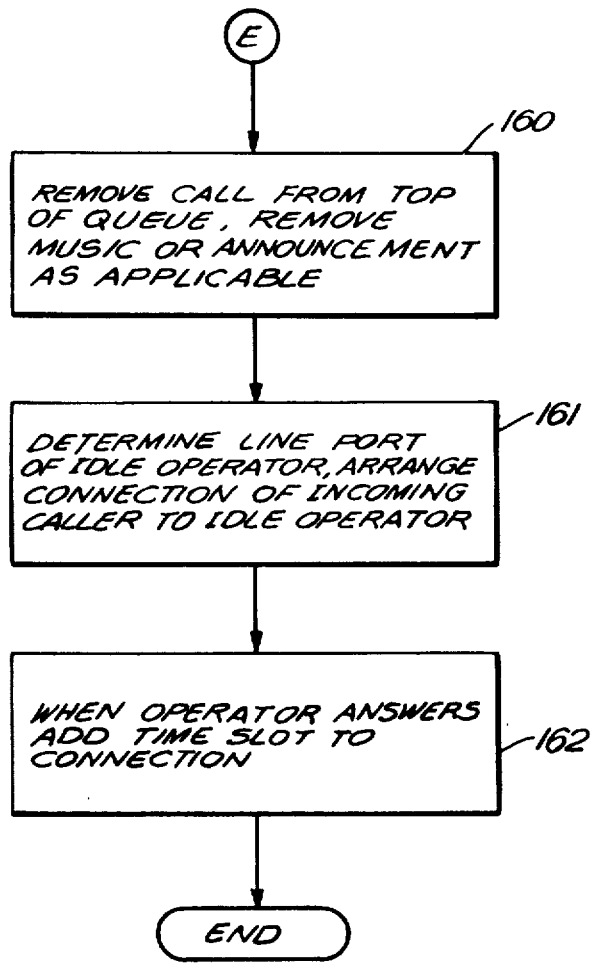

Referring to FIG. 7, the flowchart therein shows the operation of system 10 when an operator 23 becomes available to handle an incoming call which has been placed in the queue. In step 116, FIG. 3A, scanning equipment 26 detects an idle line port 22, which information is relayed to processor 30 the next time period scanning equipment 26 is interrogated by processor 30.

Step 160 has processor 30 removing the incoming call from the top position of the queue and removing music or announcement from the incoming call, whichever is applicable. In this example, step 116, the standard announcement would be removed. Processor 30, having received the status of idle line port 22 from scanning equipment 26, determines the termination location of the idle line port on matrix 20 and arranges the connection of trunk port 21 associated with the incoming call to be answered with line port 22 of idle operator 23 in step 161. When idle operator 23 responds, the status bit of the incoming call is changed in memory to indicate the call has been handled in step 162.

It will be apparent that one skilled in the art may make various modifications and changes to the methods and apparatus disclosed herein without departing from the spirit and scope of this invention.

What is claimed is:

1. A method of holding the interests of a plurality of incoming callers during the time no operator is available to answer their calls incoming simultaneously to a switching system which has at least one operator to answer incoming calls, and which switching system comprises a central processor and a memory for storing data concerning the progress of said incoming calls in the system, the method comprising the steps of:
   (1) connecting each of said incoming calls to a predetermined timed sequence of recorded announcements, each of the recorded announcements containing information concerning the handling of an incoming call by the system to assure said incoming callers that their calls will be answered and which information is different from information contained in the other recorded announcements by performing the steps of:
      (a) storing a data representation for each one of said incoming calls in service tables located in memory, each service table being associated with a respective recorded announcement, prior to interconnection of that same one call to one of the recorded announcements in the sequence;
      (b) scanning each of the service tables in a timed sequence to determine which of said incoming calls are to be connected to the recorded announcement associated with the scanned service table;
      (c) connecting each of said incoming calls having a data representation stored in the scanned table to the associated recorded announcement at the beginning of the announcement; and then
      (d) removing the stored data representations of said incoming calls from the scanned service table;
   (2) storing a different data representation for each of said incoming calls in a lower open position, with one position per data representation, of a queue table located in the memory;
   (3) disconnecting an incoming call identified by a data representation stored in the top position of the queue table from the predetermined timed sequence of recorded announcements and connecting said incoming call in said top position to an idle operator when an idle operator becomes available;
   (4) removing said data representation of said incoming call in said top position of the queue table from the queue table and from each of the service tables when the associated identified incoming call has been connected to an idle operator; and
   (5) moving each of the remaining data representations identifying calls stored in the queue table up one position in the queue table after said data representation in the top position has been removed.

2. A method as recited in claim 1 comprising the following step:
   connecting those of said incoming calls that are not connected to recorded announcements to recorded music during the intervals when those incoming calls are not connected and are waiting to be connected to one of the recorded announcements during the timed sequence.

3. Apparatus for holding an incoming caller's interest during the time no operator is available to answer an incoming call in a switching system having at least one operator to answer incoming calls, wherein the switching system comprises a central processor, a memory for storing data concerning the progress of incoming calls in the system, and a plurality of recorded announcements, each of the recorded announcements containing information concerning the handling of a particular incoming call by the system to assure the incoming caller of that particular call that his or her call will be answered and which information is different from information contained in the other recorded announcements, comprising:
   means for connecting the particular incoming call to a predetermined timed sequence of the plurality of recorded announcements, wherein the connecting means comprises:
      a plurality of service table means located in the memory for storing data representations of incoming calls prior to interconnecting the particular incoming call to a recorded announcement in the sequence, each service table means being associated with a particular recorded announcement, and
      means for interconnecting each of the incoming calls having a data representation stored in a service table means to the associated recorded announcement at the beginning of the announcement;
   queue table means in the memory for storing a data representation identifying the particular incoming call in a lower open position of the queue table means;
   means for disconnecting another incoming call identified by a data representation stored in a top position of the queue table means from the predetermined timed sequence of recorded announcements and connecting the other incoming call to an idle operator when an idle operator becomes available;
   means for removing the data representation of the other incoming call from the top position of the queue table means and from each of the service table means when the other incoming call has been connected to an idle operator; and
   means for moving each of the remaining data representations identifying calls stored in the queue table means up one position in the queue table means after the data representation in the top position has been removed.

* * * * *